US010887496B2

(12) United States Patent
Ichimura et al.

(10) Patent No.: US 10,887,496 B2
(45) Date of Patent: Jan. 5, 2021

(54) IMAGING DEVICE

(71) Applicant: KABUSHIKI KAISHA TOKAI-RIKA-DENKI-SEISAKUSHO, Aichi (JP)

(72) Inventors: Reiya Ichimura, Aichi (JP); Nobuhiro Kudou, Aichi (JP); Suguru Fujisaki, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/606,843

(22) PCT Filed: Mar. 23, 2018

(86) PCT No.: PCT/JP2018/011929
§ 371 (c)(1),
(2) Date: Oct. 21, 2019

(87) PCT Pub. No.: WO2018/198625
PCT Pub. Date: Nov. 1, 2018

(65) Prior Publication Data
US 2020/0137277 A1 Apr. 30, 2020

(30) Foreign Application Priority Data
Apr. 26, 2017 (JP) .................. 2017-087661

(51) Int. Cl.
*H04N 5/225* (2006.01)

(52) U.S. Cl.
CPC ....... *H04N 5/22521* (2018.08); *H04N 5/2252* (2013.01)

(58) Field of Classification Search
CPC ............. H04N 5/22521; H04N 5/2252; G02B 27/0006; G02B 7/02; B60S 1/60; G03B 17/55
See application file for complete search history.

(56) References Cited

U.S. PATENT DOCUMENTS

2012/0170119 A1* 7/2012 Chu .................. G03B 11/00
359/512
2016/0334619 A1* 11/2016 Nakai ............... H04N 5/23293
(Continued)

FOREIGN PATENT DOCUMENTS

JP 2590569 Y2 2/1999

OTHER PUBLICATIONS

International Search Report issued in a corresponding application PCT/JP2018/011929 dated Jun. 5, 2018.

*Primary Examiner* — Shahbaz Nazrul
(74) *Attorney, Agent, or Firm* — Roberts Calderon Safran & Cole P.C.

(57) ABSTRACT

In an imaging device, a heater heats cover glass from an outer circumferential side thereof. Here, a first heating area and a second heating area are provided respectively on a lower side and an upper side of the heater, and a heating density of the first heating area is greater than a heating density of the second heating area. Consequently, when defrosting the cover glass, it is possible to inhibit water droplets from remaining in a central portion of the cover glass and in an upper-side portion thereof above this central portion, and to inhibit water droplets from being present in the central portion of the cover glass.

4 Claims, 3 Drawing Sheets

(56) References Cited

U.S. PATENT DOCUMENTS

| | | | |
|---|---|---|---|
| 2018/0176431 A1* | 6/2018 | Kim | G02B 27/0006 |
| 2018/0210161 A1* | 7/2018 | Park | H04N 5/2257 |
| 2018/0239105 A1* | 8/2018 | Lee | G03B 17/55 |
| 2018/0314032 A1* | 11/2018 | Kim | B60R 11/04 |
| 2019/0041630 A1* | 2/2019 | Park | G03B 17/55 |
| 2019/0137723 A1* | 5/2019 | Bernal | H05B 3/06 |
| 2019/0212549 A1* | 7/2019 | Choi | B32B 7/02 |
| 2019/0353987 A1* | 11/2019 | Choi | G02B 27/0006 |
| 2020/0159090 A1* | 5/2020 | Liu | G03B 17/55 |

\* cited by examiner

IMAGING DEVICE

CROSS-REFERENCE TO RELATED APPLICATIONS

The present application is a U.S. National Phase of PCT/JP2018/011929 filed on Mar. 23, 2018, claiming priority under 35 USC 119 from Japanese Patent Application No. 2017-087661 filed Apr. 26, 2017, the disclosure of which is incorporated by reference herein.

TECHNICAL FIELD

The present disclosure relates to an imaging device.

BACKGROUND ART

In Utility Model Registration No. 2590569, a structure is described in which a condensation prevention filter is fitted onto a rear view camera, and a thin, ring-shaped heater is sealed internally between glass and an optical filter in this condensation prevention filter. In this thin, ring-shaped heater, a heat emission layer is provided in a thin, ring-shaped film, and the thin, ring-shaped heater is disposed coaxially with the optical axis of a lens unit of the rear view camera.

If, for example, a front surface of the condensation prevention filter becomes coated with frost, the thin, ring-shaped heater heats the glass and the optical filter so that the frost is melted and is removed from the front surface of the condensation prevention filter.

However, in the thin, ring-shaped heater, the heat emission layer is disposed around substantially the entire circumference of an outer circumferential portion of the glass and the optical filter, so that the glass and the optical filter become heated progressively from the outer circumferential side thereof towards the optical axis portion of the lens unit. Because of this, as the frost is removed from the front surface of the condensation prevention filter, there is a tendency for water droplets to remain on the lens unit optical axis portion of the front surface of the condensation prevention filter.

SUMMARY OF THE INVENTION

Technical Problem

The present invention was conceived in consideration of the above-described circumstances, and it is an object thereof to provide an imaging device that makes it possible to prevent water droplets from being present on an incident light optical axis portion of a transmission component.

Solution to the Problem

A first aspect of the present invention is provided with an imaging unit that includes a transmission component that transmits light, and an imaging portion that acquires an image by receiving incident light transmitted through the transmission component, and a heating body that is formed in an annular shape having an interior in which an optical axis of the incident light is located, the heating body being able to heat the transmission component, and in which a heating amount of the transmission component in an upper side portion above the incident light optical axis being greater than a heating amount of the transmission component in a lower side portion below the incident light optical axis.

A second aspect of the present invention is the first aspect of the present invention in which an amount of heating of the transmission component by the heating body is at a maximum in an upper portion of the heating body.

A third aspect of the present invention is the first or second aspects of the present invention in which a plurality of emission portions that individually emit heat and have mutually different heat emission amounts are provided in the heating body so as to extend in a circumferential direction around the incident light optical axis.

A fourth aspect of the present invention is any one of the first through third aspects of the present invention in which an amount of heating of the transmission component by the heating body becomes progressively smaller approaching a lower side thereof.

Advantageous Effects of the Invention

In the first aspect of the present invention, in an imaging unit an imaging portion acquires an image by receiving incident light transmitted through a transmission component. In addition, a heating body is formed in an annular shape, and an optical axis of the incident light is located within the heating body, and the heating body is able to heat the transmission component.

Here, an amount of heating by the heating body in an upper side portion of the transmission component above the incident light optical axis is greater compared to an amount of heating by the heating body in a lower side portion of the transmission component below the incident light optical axis. Because of this, if, for example, the transmission component is coated by frost, then when the heating body heats the transmission component so that this frost is removed from the transmission component, water droplets can be inhibited from remaining in an upper side portion of the transmission component above the incident light optical axis, and on the incident light optical axis portion of the transmission component, and water droplets can be inhibited from being present on the incident light optical axis portion of the transmission component.

In the second aspect of the present invention, the amount of heating of the transmission component by the heating body is at maximum in an upper portion of the heating body. Because of this, water droplets can be effectively inhibited from remaining on the upper side portion of the transmission component above the incident light optical axis.

In the third aspect of the present invention, a plurality of emission portions are provided in the heating body so as to extend in a circumferential direction around the incident light optical axis. The plurality of emission portions individually emit heat, and the heat emission amounts of the plurality of emission portions are mutually different. Because of this, an amount of heating of the transmission component by the heating body in an upper side portion above the incident light optical axis can be made greater compared to an amount of heating of the transmission component by the heating body in a lower side portion below the incident light optical axis.

In the fourth aspect of the present invention, the amount of heating of the transmission component by the heating body becomes progressively smaller approaching a lower side thereof. Because of this, even if an amount of heating of the transmission component by the heating body in a lower side portion below the incident light optical axis is smaller compared to an amount of heating of the transmission component by the heating body in an upper side portion above the incident light optical axis, the overall amount of heating of the transmission component by the heating body can be inhibited from being reduced, and the heating body is able to effectively heat the transmission component.

DESCRIPTION OF THE EMBODIMENTS

First Exemplary Embodiment

Hereinafter, a first exemplary embodiment of the present invention will be described with reference to the drawings.

Figure 1:
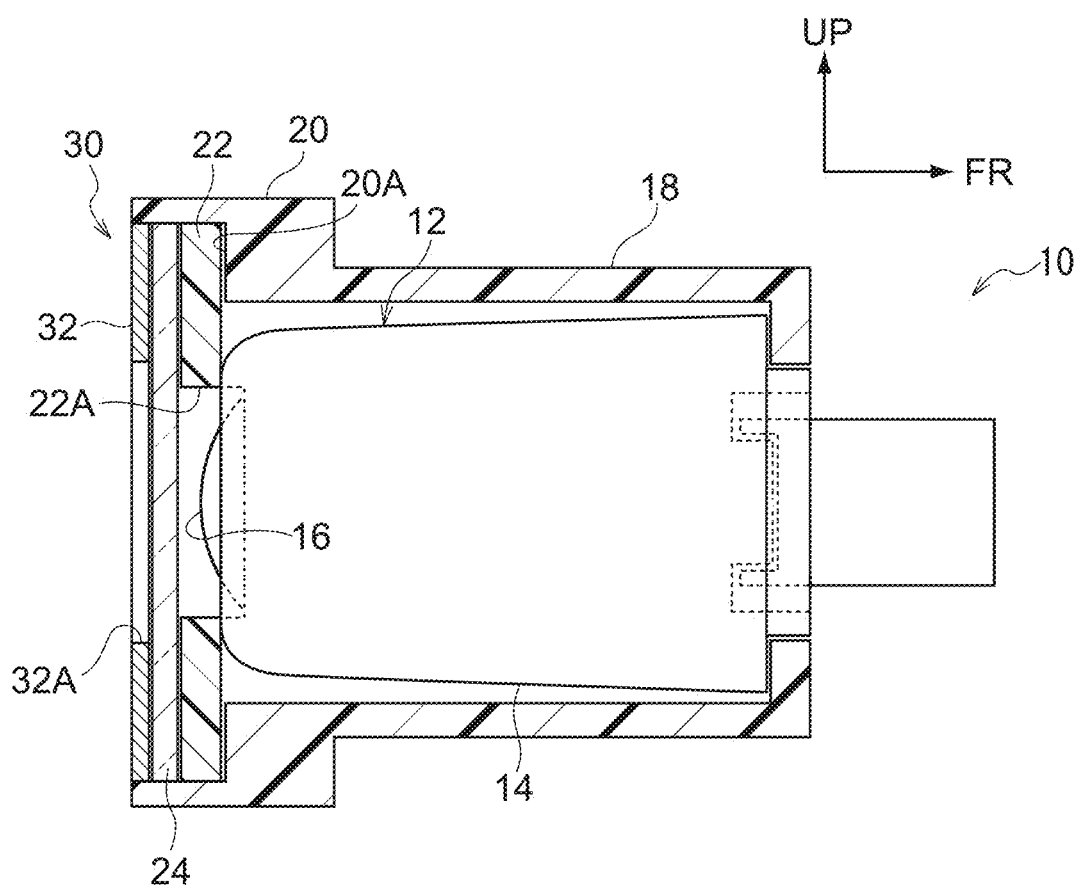
FIG. 1 is a cross-sectional view as seen from one side showing principal portions of an imaging device according to a first exemplary embodiment.

Principal portions of an imaging device 10 according to the first exemplary embodiment are shown in a cross-sectional view in FIG. 1 as seen from one side. Note that, in the drawings, a vehicle forward direction is shown by an arrow FR, a vehicle right-side direction is shown by an arrow RH, and a vehicle upward direction is shown by an arrow UP.

The imaging device 10 is disposed on an external side at a vehicle front-side end of an intermediate portion in a vehicle up-down direction of a side door (i.e., a front-side door: not shown in the drawings) which is serving as a vehicle body portion of a vehicle.

A camera 12 forming an imaging unit is provided in the imaging device 10, and the camera 12 is indirectly supported on the side door of the vehicle.

A rectangular parallelepiped box-shaped (alternatively, a substantially circular cylinder shape may be used instead) casing 14 is provided around an outer circumference of the camera 12, and a longitudinal direction (i.e., an axial direction) of the casing 14 is aligned in parallel with the vehicle front-rear direction.

A circular lens hole (not shown in the drawings) is formed on the same axis as the casing 14 so as to penetrate a vehicle rear-side wall of the casing 14. A lens 16 having a circular shape when looked at from the front thereof (i.e., as seen from the vehicle rear side) is fitted inside this lens hole so as to be coaxial therewith. A vehicle rear-side surface (i.e., a lens front surface) of the lens 16 is convexly curved so that the lens 16 protrudes from the lens hole in the casing 14 and is exposed to the vehicle rear side. The lens 16 is formed from glass, and light is able to be transmitted through the lens 16. Incident light that enters the lens 16 from the vehicle rear side and is transmitted through the lens 16 is altered such that a direction of incidence thereof into the lens 16 is not parallel with a direction of emission thereof out from the lens 16 (in other words, this incident light is able to be condensed by the lens 16).

An imaging element (i.e., an image sensor: not shown in the drawings) which serves as an imaging portion is mounted inside the casing 14. This imaging element is disposed at a vehicle front side of the lens 16 such that a center thereof is located on the optical axis of the lens 16, and such that an imaging surface (i.e., a light receiving surface) thereof faces towards the lens 16 side. In the camera 12, as a result of incident light transmitted through the lens 16 being condensed on the imaging surface of the imaging element, an image showing an area towards the vehicle rear side from the lens 16 is formed on the imaging surface of the imaging element, so that the imaging element is able to acquire an image showing the an area towards the vehicle rear side via the lens 16.

A camera housing portion 18 in the shape of a cylinder having one closed end is provided in the imaging device 10. A cross-section of the opening in the camera housing portion 18 is formed in a rectangular shape (alternatively, a circular shape may be used instead), and a bottom wall thereof is disposed on the vehicle front side. In addition, a longitudinal direction of the camera housing portion 18 is disposed so as to be parallel with the vehicle front-rear direction. Moreover, the interior of the camera housing portion 18 is open towards the vehicle rear side. A cylindrical expanded-width portion 20 is formed integrally with a vehicle rear side of the camera housing portion 18. A center of a cross-section of the opening of the expanded-width portion 20 is placed on the same straight line as the center of the cross-section of the opening of the camera housing portion 18, and an outer shape of the expanded-width portion 20 is slightly larger than an outer shape of the camera housing portion 18. The cross-section of the opening on the vehicle rear side of the expanded-width portion 20 is formed in a circular shape that is larger than the cross-section of the opening of the camera housing portion 18. Additionally, the cross-section of the opening on the vehicle front side (i.e., on the camera housing portion 18 side) of the expanded-width portion 20 is formed in the same shape as the cross-section of the opening of the camera housing portion 18, and an interior of the expanded-width portion 20 communicates with the interior of the camera housing portion 18.

The camera 12 is inserted into the interior of the camera housing portion 18 from the expanded-width portion 20 side thereof. A circular plate-shaped sealing component 22 is disposed inside the vehicle rear side of the expanded-width portion 20. An outer diameter of the sealing component 22 is formed substantially the same as an inner diameter on the vehicle rear side of the expanded-width portion 20, and a circular hole 22A is formed penetrating the sealing component 22 and coaxially with the sealing component 22. The circular hole 22A enables the portion of the lens 16 that is exposed to the vehicle rear side to be exposed to the vehicle rear side coaxially with the circular hole 22A.

The sealing component 22 is attached, around the entire circumferences thereof, to both a bottom surface 20A inside the vehicle rear side of the expanded-width portion 20 (i.e., on a vehicle front side surface thereof), and a portion of the camera 12 located on the outer side of the lens 16. The sealing component 22 is capable of forming a seal between the bottom surface 20A of the expanded-width portion 20 and the portion of the camera 12 located on the outer side of the lens 16. Note that the camera housing portion 18, including the expanded-width portion 20 and the sealing component 22, have reduced heat transfer properties.

Circular plate-shaped cover glass 24 which serves as a transmission component forming part of the imaging unit is disposed on the vehicle rear side of the sealing component 22. The cover glass 24 is formed from transparent glass (alternatively, it may instead be formed from transparent resin), and an outer diameter of the cover glass 24 is substantially the same as the inner diameter on the vehicle rear side of the expanded-width portion 20. The cover glass 24 is fitted inside the vehicle rear side of the expanded-width portion 20, and is fixed to the expanded-width portion 20 and the sealing component 22. Consequently, the camera 12 acquires an image showing the vehicle rear side via the cover glass 24.

Figure 2:
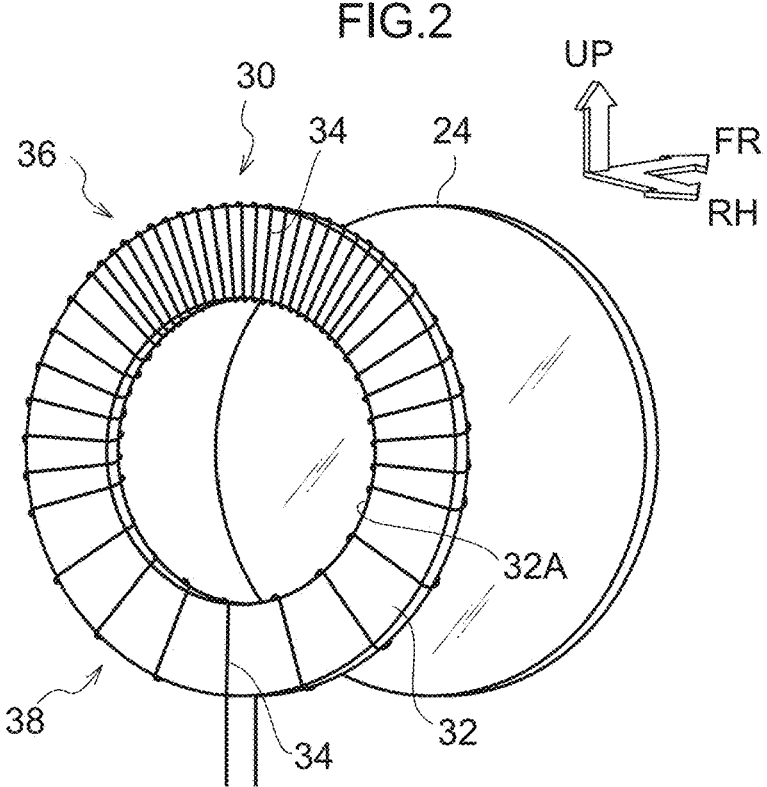
FIG. 2 is a perspective view showing a schematic structure of a heater according to the first exemplary embodiment.
Figure 3:
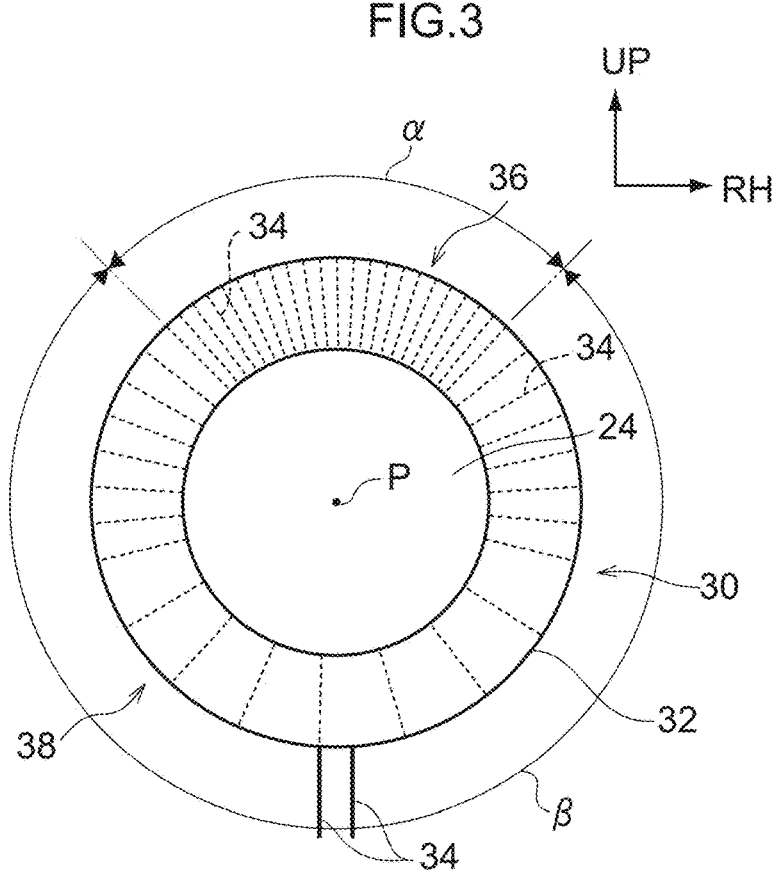
FIG. 3 is a front view of the heater according to the first exemplary embodiment.

Furthermore, a heater 30 which served as a heating body according to the first exemplary embodiment is provided on the vehicle rear side of the cover glass 24 and so as to be coaxial with the cover glass 24. In FIG. 2, the heater 30 is shown in a perspective view as seen from an obliquely rearward direction, while in FIG. 3, the heater 30 is shown in a front view as seen from the vehicle rear side.

As is shown in FIG. 2, a substantially circular plate-shaped substrate 32 which serves as a base portion is provided in the heater 30, and a circular exposure hole 32A is formed penetrating the substrate 32. The exposure hole 32A is formed in a circular shape whose center is the same as a center (i.e., an axial center) of the substrate 32. The exposure hole 32A is formed having an inner diameter that does not constrict the imaging range of the camera 12. Additionally, the substrate 32 has heat resistance properties, heat transfer properties, and electrical insulation properties.

Resistance wire 34 which serves as an emission portion is wrapped around the substrate 32, and is wrapped around both the exposure hole 32A side and the outer circumferential side of the substrate 32. The resistance wire 34 generates heat (i.e., emits heat) upon being supplied with power. The heater 30 is what is known as a hot-wire type of heater that utilizes the resistance wire 30.

A first heating area 36 which serves as a first heating portion, and a second heating area 38 which serves as a second heating portion are provided in the substrate 32 extending in the circumferential direction of the heater 30. The first heating area 36 is set to the range of an angle $\alpha$ in the circumferential direction of the heater 30, and this angle $\alpha$ is set to substantially 90°. The second heating area 38 is set to the remaining area excluding the first heating area 36 (i.e., to the area of the range of an angle $\beta$) in the circumferential direction of the heater 30.

In the first heating area 36, the resistance wire 34 is wound uniformly and densely (i.e., such that intervals between winds of the resistance wire 34 are narrow) around the substrate 32, while in the second heating area 38, the resistance wire 34 is wound around the substrate 32 more loosely than in the first heating area 36 (i.e., such that intervals between winds of the resistance wire 34 are wider than in the first heating area 36). In addition, the resistance wire 34 leads away from the heater 30 on the opposite side from the first heating area 36 (i.e., in a central location of the second heating area 38), and in the second heating area 38 the resistance wire 34 is wound progressively looser around the substrate 32 the further away it is from the first heating area 36.

As a consequence, not only is a heat emission density (i.e., an amount of heat that is emitted per unit length in the circumferential direction) of the heater 30 greater in the first heating area 36 than in the second heating area 38, but the heat emission density becomes progressively smaller in the second heating area 38 the further it is from the first heating area 36.

Before the heater 30 is used, the substrate 32 around which the resistance wire 34 has been wound is covered by a material (not shown in the drawings) having water proof and moisture proof properties. The heater 30 is fitted inside the vehicle rear side of the expanded-width portion 20 such that the center in the circumferential direction of the first heating area 36 is disposed at an upper end thereof, and the heater 30 is mounted so as to be in tight contact with a surface on the vehicle rear side of the cover glass 24.

As a consequence, when a center P of the cover glass 24 is disposed on the optical axis of the lens 16, this center P of the cover glass 24 is exposed to the vehicle rear side through the exposure hole 32A in the heater 30, so that the camera 12 is able to acquire an image of the vehicle rearward side through the exposure hole 32A in the heater 30.

In the imaging device 10, the camera 12 (i.e., the imaging element) and the heater 30 (i.e., the resistance wire 34) are electrically connected to a control device (not shown in the drawings) that is provided in the vehicle. A monitor (not shown in the drawings) which serves as a display unit is electrically connected to the control device, and acquired images that have been acquired by the imaging device are controlled by the control device so as to be displayed on this monitor. The monitor is disposed inside a vehicle cabin. If a vehicle occupant monitors acquired images from the camera 12 that are displayed on the monitor, the visibility of the vehicle occupant towards the vehicle rear side is improved. Additionally, in the imaging device 10, the heater 30 is operated by power supplied from the control device to the resistance wire 34, so that the cover glass 24 is heated from the entire outer circumferential side towards the center P side.

Next, an action of the first exemplary embodiment will be described.

In the imaging device 10 having the above-described structure, as a result of the camera 12 being operated, an imaging element acquires, through the lens 16 and the cover glass 24, an image showing the vehicle rear side.

Moreover, in the imaging device 10, as a result of the heater 30 being operated, the cover glass 24 is heated by the heater 30 from the outer circumferential side towards the center P side. Because of this, if the cover glass 24 becomes coated with frost, the cover glass 24 can be defrosted (i.e., the frost can be melted), and if any misting is generated on the cover glass 24, the cover glass 24 can also be demisted.

Here, in the heater 30, the heat emission density of the first heating area 36 is greater than the heat emission density of the second heating area 38 (i.e., the heat emission density of the second heating area 38 is set lower than the heat emission density of the first heating area 36), and the amount of heating of the cover glass 24 by the heater 30 in the upper-side portion above the center P is greater compared to the amount of heating of the cover glass 24 by the heater 30 in the lower-side portion below the center P. Because of this, when defrosting the cover glass 24, it is easier for water droplets created by the defrosting to remain in the lower-side portion below the center P portion of the cover glass 24, and to inhibit these water droplets from remaining in the center P portion of the cover glass 24 and in the upper-side portion above the center P. As a consequence, it is possible to inhibit water droplets from being present in the center P of the cover glass 24, and to inhibit incident light arriving at the center P of the cover glass 24 from being diffusely reflected by these water droplets, and to inhibit an image acquired by the camera 12 from appearing as a white blurry image. Moreover, it is also possible to inhibit the water droplets from falling easily onto a lower side of the cover glass 24 below the imaging range of the imaging element, and to thereby effectively inhibit an image acquired by the camera 12 from appearing as a white blurry image.

Furthermore, a center in the circumferential direction of the first heating area 36 (i.e., an area of the maximum heat emission density) is located at an upper end of the heater 30. Because of this, it is possible to effectively increase the amount of heating by the heater 30 in the upper-side portion above the center P of the cover glass 24, and to effectively make it easier for water droplets created by the defrosting to remain in the lower-side portion below the center P portion of the cover glass 24, and to effectively inhibit these water droplets from remaining in the center P portion of the cover glass 24 and in the upper-side portion above the center P.

In addition, in the heater 30, the heat emission density of the second heating area 38 becomes progressively smaller the further it is from the first heating area 36. Because of this, it is possible to increase the amount of heating by the second heating area 38 in the upper-side portion above the center P of the cover glass 24, and to make it even easier for water droplets created by the defrosting to remain in the lower-side portion below the center P of the cover glass 24, and to even more effectively inhibit these water droplets from remaining in the center P portion of the cover glass 24 and in the upper-side portion above the center P. Moreover, even if the heat emission density of the second heating area 38 is made less than the heat emission density of the first heating area 36, the overall amount of heating of the cover glass 24 by the heater 30 can be inhibited from being reduced, and the heater 30 is able to effectively heat the cover glass 24, so that defrosting of the cover glass 24 can be performed effectively.

Second Exemplary Embodiment

Figure 5:
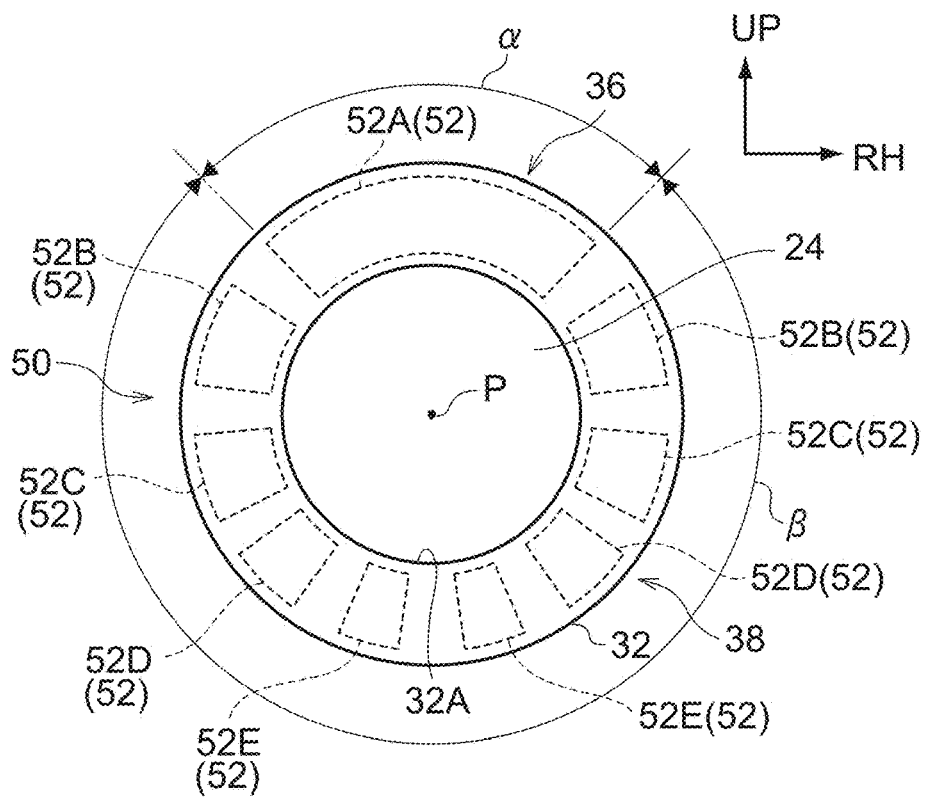
FIG. 5 is a front view of the heater according to the second exemplary embodiment.

Next, a second exemplary embodiment of the present invention will be described. A heater 50 which serves as a heating body according to the second exemplary embodiment is shown in a perspective view as seen from an obliquely rearward direction, while in FIG. 5, the heater 50 is shown in a front view as seen from the vehicle rear side.

In the second exemplary embodiment, the heater 50 is provided in the imaging device 10 instead of the heater 30 of the first exemplary embodiment.

A plurality of PTC (positive temperature coefficient) heating elements 52 which serve as heat emission portions are provided in the substrate 32, so that the heater 50 is what is known as a PTC heater. The PTC heating elements 52 are divided into a plurality of different elements and are arranged in the circumferential direction of the substrate 32. In the present exemplary embodiment, PTC heating elements 52A, 52B, 52C, 52D, and 52E which each have the same dimensions in the radial direction of the substrate 32, but mutually different dimensions in the circumferential direction of the substrate 32 are used, and the dimensions in the circumferential direction of the substrate 32 of the PTC heating elements 52A, 52B, 52C, 52D, and 52E become progressively smaller in that sequence.

Figure 4:
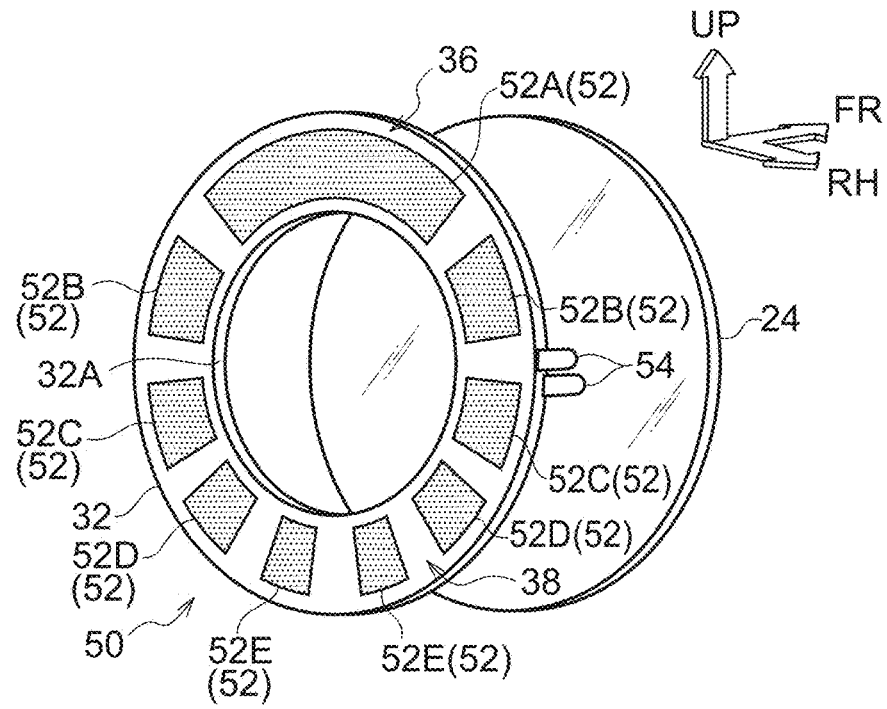
FIG. 4 is a perspective view showing a schematic structure of a heater according to a second exemplary embodiment.

In the heater 50, the PTC heating elements 52B, 52C, 52D, and 52E are arranged in that sequence at equidistant intervals on both sides of the PTC heating element 52A, and the interval between the two PTC heating elements 52E is greater than the other intervals. Moreover, as is shown in FIG. 4, a pair of terminals 54 (not shown in FIG. 5) protrude outwards in a radial direction from the substrate 32, and electrode wire (i.e., electrical wiring: not shown in the drawings) that electrically connects each of the pair of terminals 54 to each of the PTC heating elements 52 (i.e., 52A~52E) is provided within the substrate 32.

In the heater 50, when power is supplied to the pair of terminals 54, each of the PTC heating elements 52 (i.e., 52A~52E) emits heat. The PTC heating elements 52 (i.e., 52A~52E) have different heat emission amounts depending on their surface area, and the heat emission amount thereof is correspondingly greater as the surface area thereof increases.

In the heater 50, the PTC heating element 52A is provided so as to extend for the entire circumferential direction of the first heating area 36, while the PTC heating elements 52B~52E are provided in the second heating area 38.

The heater 50 emits progressively smaller amounts of heat in stages moving away in the circumferential direction from the PTC heating element 52A of the first heating area 36. Consequently, the amount of heat that is emitted is the smallest (i.e., is set to zero) in the furthest position from the first heating area 36 (i.e., in a position midway between the PTC heating elements 52E).

Here, in the heater 50 of the second exemplary embodiment as well, the same type of effects as those obtained from the heater 30 of the first exemplary embodiment can also be obtained.

Furthermore, in the heater 50 of the second exemplary embodiment, the plurality of PTC heating elements 52 (i.e., 52A~52E) are provided in the circumferential direction, and the heat emission amounts of the plurality of PTC heating elements 52 (i.e., 52A~52E) are mutually different from each other. Because of this, it is easy to adjust the heat emission density of the heater 50, and it is also easy to make the heat emission density of the first heating area 36 greater than the heat emission density of the second heating area 38, and to also make it easy to ensure that the heat emission density of the second heating area 38 becomes progressively smaller the further it is from the first heating area 36.

Moreover, the heat emission amount of the PTC heating elements 52 is adjusted by adjusting the surface area of the PTC heating elements 52. Because of this, the heat emission amount of the PTC heating elements 52 can be adjusted easily, and the heater 50 can be manufactured easily.

Note that, in the second exemplary embodiment, the amount of heat emitted by the heater 50 changes in stages in the circumferential direction, however, the present invention is not limited to a structure in which the heat emission amount changes in stages, and it is possible for the heat emission amount to instead change continuously.

For example, it is also possible to employ a structure in which the dimensions of the PTC heating elements 52 become progressively smaller in the radial direction of the substrate 32, so that the heat emission amounts of the PTC heating elements 52 continuously decrease.

Note that, in the above-described first and second exemplary embodiments, the range of the first heating portion is set to the range of the angle $\alpha$ in the circumferential direction of the transmission component, and the range of the angle $\alpha$ is set to substantially 90°. However, the range of the first heating portion is not limited to this. The angle $\alpha$ may be set to less than 90°, however, if the angle $\alpha$ is set to less than 90°, then because the amount of heating of the upper-side portion of the transmission component by the first heating portion is reduced, it is preferable that the angle $\alpha$ is not a great deal less than 90°.

Additionally, it is also possible for the angle $\alpha$ to be set to more than 180°. If, however, the angle $\alpha$ is set to more than 180°, then because the amount of heating of the lower-side portion of the transmission component by the first heating portion is increased, it is preferable that the angle α is not a great deal more than 180°, and more preferable that the angle α is less than 180°. Accordingly, it is preferable that the range of the first heating portion be determined so as to include the sum of the heat emission amount from the first heating portion and the heat emission amount from the second heating portion, and also the difference between the heat emission amount from the first heating portion and the heat emission amount from the second heating portion.

Moreover, in the first exemplary embodiment, the resistance wire 34 is used as an emission portion, while in the second exemplary embodiment, the PTC heating elements 52 are used as emission portions. However, the emission portions are not limited to the resistance wire 34 and the PTC heating elements 52, and other structures that emit heat may be used instead.

Note that, in the first and second exemplary embodiments, the camera 12 is formed so as to be able to acquire images of an area to the vehicle rear side. However, it is also possible for the camera 12 to be able to acquire images in other directions (for example, towards a lower side, towards an upper side, towards an inner side in the vehicle width direction, towards an outer side in the vehicle width direction, and towards the vehicle front side).

In addition, in the first and second exemplary embodiments, the outer shape of the cover glass 2 which serves as a transmission component is formed in a circular plate shape, however, the transmission component is not limited to being formed in a circular plate shape, and may instead be formed in another shape such as a rectangular shape or the like. If the transmission component is formed in a rectangular shape, then the opening on the vehicle rear side of the expanded-width portion 20 is formed in a rectangular shape, and a sealing component having a rectangular outer shape may be provided instead of the sealing component 22. In the heater 50 according to the second exemplary embodiment, a rectangular substrate may be provided instead of the substrate 32, and the PTC heating elements 52 may be provided on this substrate. In the heater 30 according to the first exemplary embodiment, the gap between the substrate 32 and the internal surface of the opening in the expanded-width portion 20 may be filled by interposing a spacer between the substrate 32 and the internal surface of the opening in the expanded-width portion 20.

Moreover, in the first and second exemplary embodiments, the defrosting of the cover glass 24 which is serving as the transmission component is described as an example, however, the heating body is not limited to being provided in the cover glass 24, and may also be provided in a transmission component that has the possibility of becoming frosted and the like in the camera 12. For example, if the lens 16 is exposed to the outside, then the heating body may also be provided in the lens 16.

Furthermore, in the first and second exemplary embodiments, the imaging device 10 is provided in a side door of a vehicle. However, the imaging device 10 may also be installed in a location other than the side door of a vehicle (both outside and inside the vehicle), or in a location other than a vehicle.

Exemplary embodiments (i.e., a first and a second exemplary embodiment) of the present invention have been described above, however, the present invention is not limited to these embodiments and various other modifications, additions, and omissions and the like may be made thereto insofar as they do not depart from the spirit or scope of the present invention.

Priority is claimed on Japanese Patent Application No. 2017-087661, filed Apr. 26, 2017, the disclosure of which is incorporated herein by reference.

All references, patent applications and technical specifications cited in the present specification are incorporated by reference into the present specification to the same extent as if the individual references, patent applications and technical specifications were specifically and individually recited as being incorporated by reference.

The invention claimed is:

1. An imaging device comprising:
an imaging unit that includes a transmission component that transmits light, and an imaging portion that acquires an image by receiving incident light transmitted through the transmission component; and
a heating body that is formed in an annular shape having an interior in which an optical axis of the incident light is located, the heating body being able to heat the transmission component, and in which a heating amount of the transmission component in an upper side portion above the incident light optical axis being greater than a heating amount of the transmission component in a lower side portion below the incident light optical axis.

2. The imaging device according to claim 1, wherein an amount of heating of the transmission component by the heating body is at a maximum in an upper portion of the heating body.

3. The imaging device according to claim 1, wherein a plurality of emission portions that individually emit heat and have mutually different heat emission amounts are provided in the heating body so as to extend in a circumferential direction around the incident light optical axis.

4. The imaging device according to claim 1, wherein an amount of heating of the transmission component by the heating body becomes progressively smaller approaching a lower side thereof.

* * * * *